United States Patent
Lai et al.

(10) Patent No.: US 9,603,456 B2
(45) Date of Patent: Mar. 28, 2017

(54) ROTATING DEVICE FOR ARMREST

(71) Applicants: Yu-Shan Lai, Taibao (TW); Yen-Chuan Lai, Taibao (TW)

(72) Inventors: Yu-Shan Lai, Taibao (TW); Yen-Chuan Lai, Taibao (TW)

( * ) Notice: Subject to any disclaimer, the term of this patent is extended or adjusted under 35 U.S.C. 154(b) by 104 days.

(21) Appl. No.: 14/791,509

(22) Filed: Jul. 6, 2015

(65) Prior Publication Data
US 2017/0007024 A1    Jan. 12, 2017

(51) Int. Cl.
*A47C 7/54* (2006.01)
*B60N 2/46* (2006.01)

(52) U.S. Cl.
CPC .............. *A47C 7/54* (2013.01); *B60N 2/4626* (2013.01); *B60N 2/4633* (2013.01)

(58) Field of Classification Search
CPC ....... A47C 7/54; B60N 2/4626; B60N 2/4633
See application file for complete search history.

(56) References Cited

U.S. PATENT DOCUMENTS

| | | | | |
|---|---|---|---|---|
| 6,609,758 B1* | 8/2003 | Lefevere | .............. | B60N 2/4626 297/367 R |
| 9,004,603 B1* | 4/2015 | Wang | .............. | A47C 7/54 297/411.35 |
| 2003/0025378 A1* | 2/2003 | Lin | .............. | A47C 1/03 297/411.35 |
| 2004/0135419 A1* | 7/2004 | Kitamura | .............. | A47C 1/03 297/411.3 |
| 2009/0026826 A1* | 1/2009 | Cebula | .............. | B60N 2/4633 297/411.32 |
| 2011/0187175 A1* | 8/2011 | Faccin | .............. | B60N 2/4633 297/411.21 |
| 2014/0139001 A1* | 5/2014 | Bauer | .............. | A47C 7/54 297/411.35 |
| 2014/0167478 A1* | 6/2014 | Bauer | .............. | A47C 1/03 297/411.38 |
| 2015/0130250 A1* | 5/2015 | Masunaga | .............. | A47C 7/54 297/411.36 |
| 2015/0223610 A1* | 8/2015 | Tsai | .............. | A47C 1/03 297/411.32 |
| 2016/0347215 A1* | 12/2016 | Brockman | .............. | B60N 2/4445 |

* cited by examiner

*Primary Examiner* — Timothy J Brindley
(74) *Attorney, Agent, or Firm* — Alan D. Kamrath; Kamrath IP Lawfirm, P.A.

(57) ABSTRACT

A rotating device for an armrest is connected with a fixing mount disc on a top surface of an armrest seat and is rotatably coupled with a rotary plate on a bottom surface of the support plate. The fixing mount disc includes a conical groove and a threaded orifice formed on the conical groove, and the conical groove has a toothed slot. The rotary plate includes a post corresponding to the conical groove and the toothed slot, the rotary plate also includes an extending fringe extending outwardly from an outer side thereof to contact with a peripheral side of the fixing mount disc, wherein the post has two recesses, each recess extends outwardly from each of two sides of the post to accommodate each of two slidable retainers, and each slidable retainer is pushed by a spring and has a locking tab for retaining with the toothed slot.

2 Claims, 4 Drawing Sheets

ROTATING DEVICE FOR ARMREST

BACKGROUND OF THE INVENTION

Field of the Invention

The present invention relates to a rotating device for an armrest which rotates a support plate relative to a toothed slot to adjust an angle between a support plate and an armrest seat smoothly.

Description of the Prior Art

A conventional armrest is adapted to support user's hand, so a height and an angle of the conventional armrest influence using comfort greatly. However, the angle of the conventional armrest cannot be adjusted.

To overcome above-mentioned problem, a conventional rotating device has been developed and contains: a support plate rotatably connected with an armrest seat, an abutting member defined between the support plate and the armrest seat (for example, a spring and a ball retain with a locking trench), such that the abutting member engages with the support plate (wherein when a rotating force to the support plate is greater than an engaging force, the support plate is rotated). Nevertheless, when rotating the support plate, noises occur (because the ball slides out of the locking trench and enters into another locking trench), and the abutting member cannot support the support plate when a user places his/her arms on the support plate, hence the user cannot stand up from the armrest stably.

The present invention has arisen to mitigate and/or obviate the afore-described disadvantages.

SUMMARY OF THE INVENTION

The primary objective of the present invention is to provide a rotating device for an armrest which rotates a support plate relative to a toothed slot to adjust an angle between a support plate and an armrest seat smoothly.

Accordingly, a rotating device for an armrest provided by the present invention is connected with a fixing mount disc on a top surface of an armrest seat and is rotatably coupled with a rotary plate on a bottom surface of the support plate.

The fixing mount disc includes a conical groove defined on a top surface thereof and includes a threaded orifice formed on a central position of the conical groove, and the conical groove has a toothed slot defined around an outer rim thereof.

The rotary plate includes a post corresponding to the conical groove and the toothed slot, the rotary plate also includes an extending fringe extending outwardly from an outer side thereof to contact with a peripheral side of the fixing mount disc, wherein the post has two recesses, each recess extends outwardly from each of two sides of the post to accommodate each of two slidable retainers, and each slidable retainer is pushed by a spring and has a locking tab for retaining with the toothed slot.

In operation, each slidable retainer is pushed by the spring to move outwardly, and the locking tab engages with the toothed slot, such that after each slidable retainer is pressed, the toothed slot disengages from the locking tab to rotate freely, hence the support plate is rotated relative to the toothed slot to adjust an angle between the support plate and the armrest seat.

Thereby, the angle between the support plate and the armrest seat is adjusted by the rotating device, and the toothed slot of the fixing mount disc of the rotating device disengages from the locking tab of the rotary plate by pressing each slidable retainer, such that the support plate is rotated smoothly and quietly, and the rotary plate is coupled with the fixing mount disc securely so that when a user holds the support plate to stand up, he/she is supported by the support plate stably.

Preferably, two slidable retainers of the rotating device below two sides of the support plate are pressed to adjust an angle of the support plate, thus operating the support plate with an even force (i.e., the support plate is pulled upward or is pressed downward smoothly).

In addition, the rotating device contains the post and the extending fringe of the rotary plate for cooperating with and the conical groove and the toothed slot of the fixing mount disc so as to reduce tolerance and a shake after connecting the fixing mount disc, the rotary plate, the armrest seat and the support plate together.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
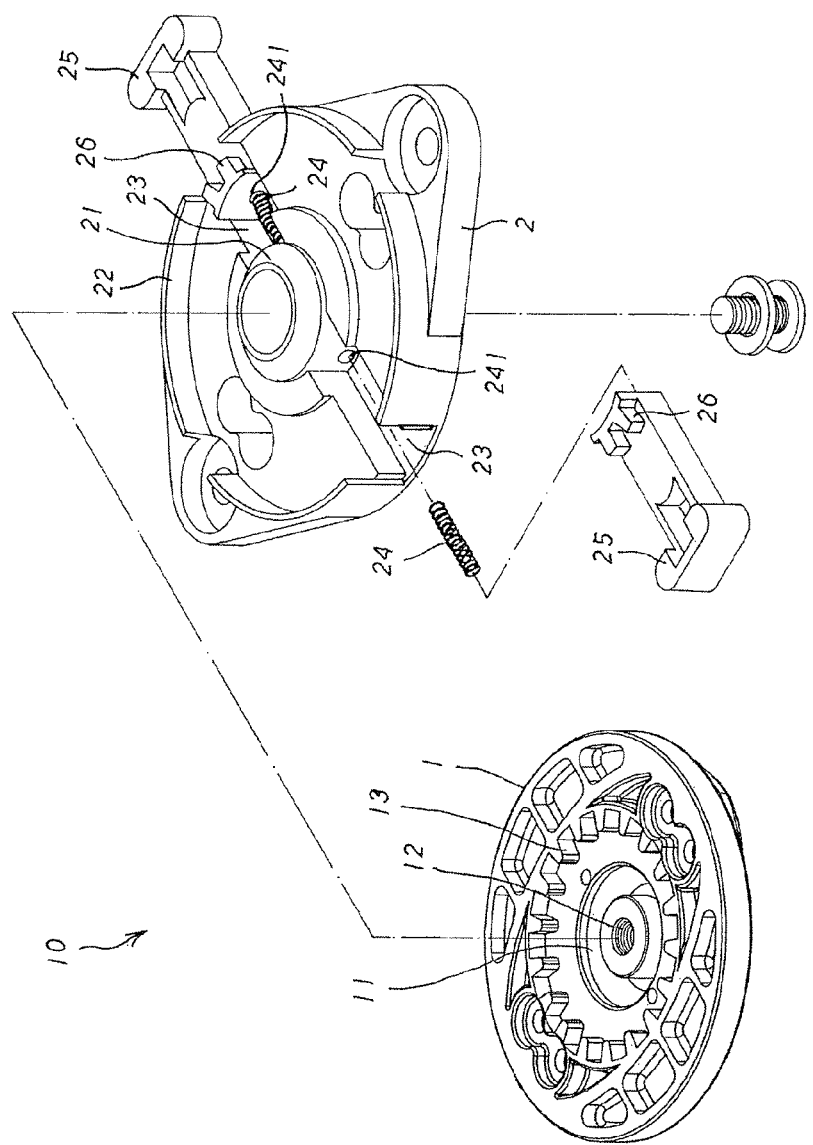
FIG. 1 is a perspective view showing the exploded components of a rotating device for an armrest in accordance with a preferred embodiment of the present invention.

A rotating device 10 for an armrest according to a preferred embodiment of the present invention is connected with a fixing mount disc 1 on a top surface of an armrest seat 3 and is rotatably coupled with a rotary plate 2 on a bottom surface of the support plate 4 (as shown in FIG. 1), wherein the fixing mount disc 1 includes a conical groove 11 defined on a top surface thereof and includes a threaded orifice 12 formed on a central position of the conical groove 11 (in this embodiment, a diameter of a bottom end of the threaded orifice 12 is less than that of a top end of the threaded orifice 12 so that a screw screws with the threaded orifice 12; in another embodiment, a connecting orifice or a shaft is rotatably joined with a pin key), and the conical groove 11 has a toothed slot 13 defined around an outer rim thereof;

the rotary plate 2 includes a post 21 corresponding to the conical groove 11 and the toothed slot 13, the rotary plate 2 also includes an extending fringe 22 extending outwardly from an outer side thereof to contact with a peripheral side of the fixing mount disc 1, wherein the post 21 has two recesses 23, each recess 23 extends outwardly from each of two sides of the post 21 to accommodate each of two slidable retainers 25, and each slidable retainer 25 is pushed by a spring 24 and has a locking tab 26 for retaining with the toothed slot 13.

Figure 2:
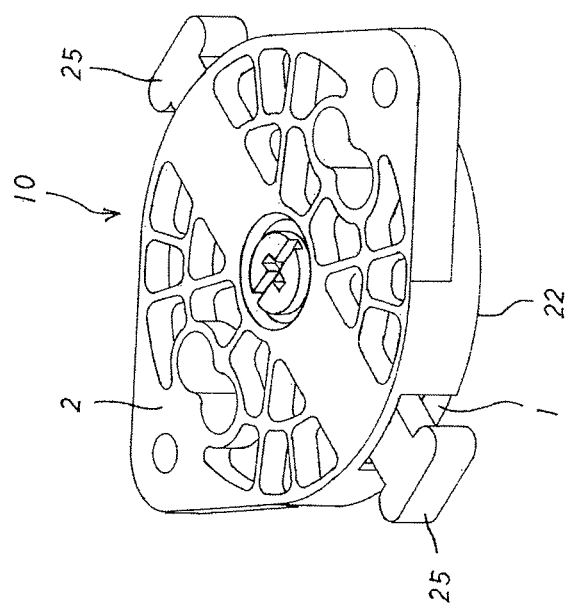
FIG. 2 is a perspective view showing the assembly of the rotating device for the armrest in accordance with the preferred embodiment of the present invention.
Figure 3:
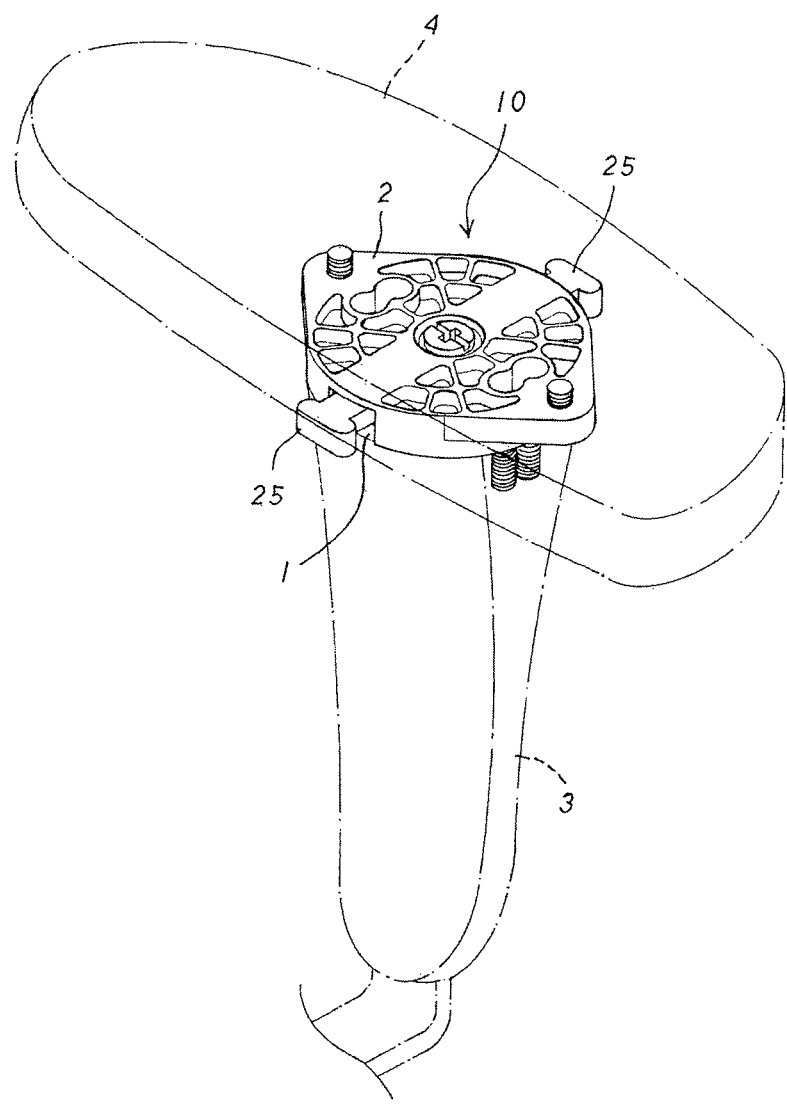
FIG. 3 is a perspective view showing the application of the rotating device for the armrest in accordance with the preferred embodiment of the present invention.

In operation, each slidable retainer 25 is pushed by the spring 24 to move outwardly, and the locking tab 26 engages with the toothed slot 13, such that after each slidable retainer 25 is pressed, the toothed slot 13 disengages from the locking tab 26 to rotate freely, hence the support plate 4 is rotated relative to the toothed slot 13 to adjust an angle between the support plate 4 and the armrest seat 3 (as illustrated in FIGS. 2 and 3).

Figure 4:
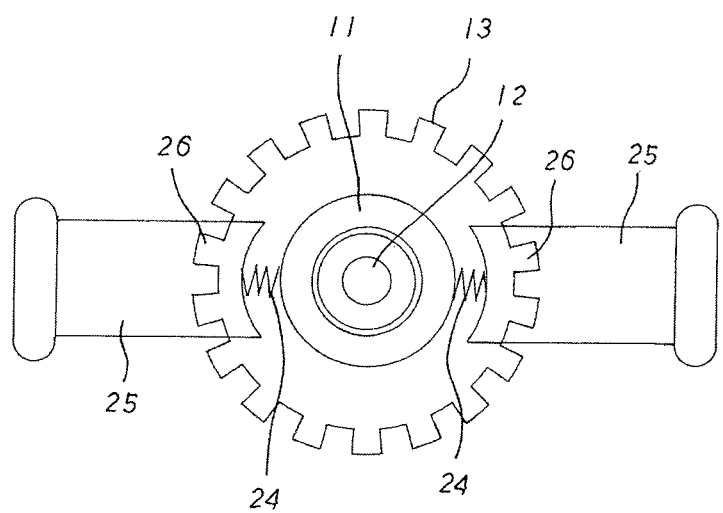
FIG. 4 is a side plan view showing the operation of two slidable retainers and a toothed slot of the rotating device for the armrest in accordance with the preferred embodiment of the present invention.

Thereby, the angle between the support plate 4 and the armrest seat 3 is adjusted by the rotating device 10, and the toothed slot 13 of the fixing mount disc 1 of the rotating device 10 disengages from the locking tab 26 of the rotary plate 2 by pressing each slidable retainer 25, such that the support plate 4 is rotated smoothly and quietly, and the rotary plate 2 is coupled with the fixing mount disc 1 securely so that when a user holds the support plate 4 to stand up, he/she is supported by the support plate 4 stably. Preferably, two slidable retainers 25 of the rotating device 10 below two sides of the support plate 4 are pressed to adjust an angle of the support plate 4 (as illustrated in FIG. 4), thus operating the support plate 4 with an even force (i.e., the support plate 4 is pulled upward or is pressed downward smoothly). In addition, the rotating device 10 contains the post 21 and the extending fringe 22 of the rotary plate 2 for cooperating with and the conical groove 11 and the toothed slot 13 of the fixing mount disc 1 so as to reduce tolerance and a shake after connecting the fixing mount disc 1, the rotary plate 2, the armrest seat 3 and the support plate 4 together.

Preferably, the post 21 also has two notches 241, and each notch 241 is defined on each of the two sides of the post 21 to accommodate each of two springs 24 and to correspond to each recess 23 and each slidable retainer 25.

While we have shown and described various embodiments in accordance with the present invention, it is clear to those skilled in the art that further embodiments may be made without departing from the scope of the present invention.

What is claimed is:

1. A rotating device for an armrest being connected with a fixing mount disc on a top surface of an armrest seat and being rotatably coupled with a rotary plate on a bottom surface of the support plate, wherein
    the fixing mount disc includes a conical groove defined on a top surface thereof and includes a threaded orifice formed on a central position of the conical groove, and the conical groove has a toothed slot defined around an outer rim thereof;
    the rotary plate includes a post corresponding to the conical groove and the toothed slot, the rotary plate also includes an extending fringe extending outwardly from an outer side thereof to contact with a peripheral side of the fixing mount disc, wherein the post has two recesses, each recess extends outwardly from each of two sides of the post to accommodate each of two slidable retainers, and each slidable retainer is pushed by a spring and has a locking tab for retaining with the toothed slot.

2. The rotating device for the armrest as claimed in claim 1, wherein the post also has two notches, and each notch is defined on each of the two sides of the post to accommodate each of two springs and to correspond to each recess and each slidable retainer.

* * * * *